Dec. 15, 1964  A. F. WADE  3,161,422
HITCH ASSEMBLY
Filed Aug. 1, 1963

INVENTOR.
Arnold F. Wade
BY
Hovey, Schmidt, Johnson & Hovey
ATTORNEYS.

United States Patent Office 3,161,422
Patented Dec. 15, 1964

3,161,422
HITCH ASSEMBLY
Arnold F. Wade, 126 Clark St., Chenoa, Ill.
Filed Aug. 1, 1963, Ser. No. 299,411
1 Claim. (Cl. 280—508)

This invention relates to a hitch assembly and, more particularly, to such an assembly which may be attached to a first vehicle whereby, when the hitch assembly is utilized, the first vehicle is coupled to a second vehicle.

It is the primary object of this invention to provide a hitch assembly which can be quickly and easily attached to one of two vehicles, such as to the drawbar of a tractor or the tongue of a wheeled implement, wagon, or the like, whereby the same two vehicles may be coupled together.

It will be appreciated that the hitch assembly may be attached to an extension on either the first or the second of the vehicles to be coupled together, this being a matter of choice of the user of the hitch assembly.

It is, therefore, the primary object of this invention to provide a hitch assembly adapted for attachment to an extension of a vehicle, for receiving, in coupling engagement, an extension of a second vehicle, the hitch assembly including a guide chute having a mouth portion and a throat portion, there being an opening extending through said guide chute; a coupling pin reciprocably associated with the hitch assembly; and a lever for allowing the reciprocating movement of said coupling pin from one end of its path of travel to the other end of its path of travel when the lever is actuated by movement of the extension of the second vehicle through the opening of the hitch assembly which has been attached to a first vehicle.

It is yet a further aim of this invention to provide a hitch assembly which automatically couples two vehicles together when the extension, such as a tongue or drawbar, of a second vehicle is moved through a longitudinally extending opening in the hitch assembly, which assembly has been attached to a first vehicle, whereby to actuate an L-shaped, pivotally mounted lever, the lever allowing the shifting movement of a coupling pin from one end of its path of travel to the other end thereof, the coupling pin, during said movement, passing through a perforation provided in the extension of the second vehicle whereby to couple said second vehicle with said first vehicle.

Other objects of this invention include details of construction such as the position and configuration of the L-shaped lever which serves to actuate the subject hitch assembly; the provision of an actuator block on the base of said lever; the manner in which the lever is resiliently biased toward a position underlying the coupling pin when it is at one end of its path of travel; the manner in which the coupling pin is received within aligned openings in the throat portion of the guide chute and also within a similarly aligned opening in a beam; the provision of a coil spring surrounding said pin between the beam and the throat portion of the guide chute whereby to normally bias the same to the other end of its path of travel; and other details of construction which will become apparent from the following specification and accompanying drawing, wherein:

Figure 1:
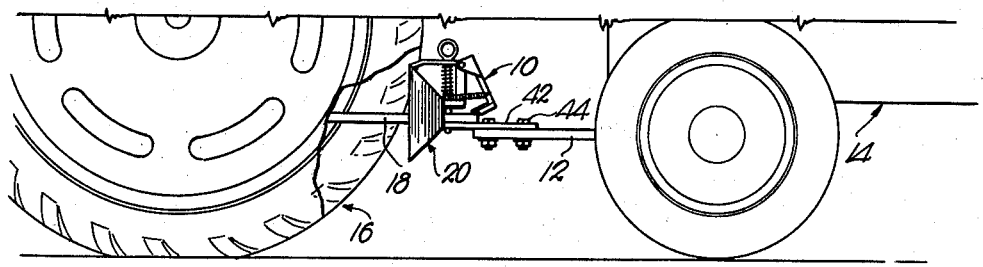
FIGURE 1 is a fragmentary, elevational view showing portions of a first and second vehicle, the hitch assembly being attached to the tongue of the first vehicle.

The hitch assembly, broadly designated by the numeral 10, is adapted for attachment to an extension of a vehicle, the same being shown in FIG. 1 of the drawing for purposes of illustration only, as attached to the tongue 12 of a wagon such as 14 whereby the wagon 14 may be coupled with a tractor 16 as a result of an extension 18 of the tractor 16, in the nature of a drawbar or the like, being engaged by the hitch assembly 10.

It will be appreciated that assembly 10 may be utilized to couple two vehicles together either by mounting the assembly 10 upon an extension of the second vehicle, such as upon the drawbar of a tractor 16 or the like, or if desired, by mounting the assembly 10 upon an extension, such as a tongue or the like, of a first vehicle, such as the wagon or trailer 14 illustrated. Thus, it is only necessary to mount the hitch assembly 10 upon the extension of one of the two vehicles to be coupled together, the only additional requirement, for the utilization of the hitch assembly, being that the extension of the other vehicle of the two to be coupled together, have a perforation therein for receiving the coupling pin of the hitch assembly as will be hereinafter described.

Hitch assembly 10 includes a guide chute 20 having a mouth portion 22 and a throat portion 24, the mouth portion 22 being generally pyramidal in configuration and being defined by four walls 26, which walls 26 converge toward one another as the throat portion 24 of guide chute 20 is approached. The throat portion 24 of guide chute 20 is likewise defined by four walls which, in effect, constitute a continuation of the four walls 26 defining the mouth portion 22 of the guide chute 20, said walls of the throat portion including a pair of opposed side walls 28, a top wall 30, and a normally bottom wall 32.

A normally longitudinally extending, central opening 34 is defined by the mouth portion 22 and throat portion 24 of the guide chute 20, said opening being adapted to receive the extension 18 of the second vehicle 16, which extension 18 is provided with a perforation 36 therethrough for purposes which will be hereinafter made apparent.

The top wall 30 of throat portion 24 has a hole 38 formed therethrough, which hole is in spaced, aligned relationship to a hole 40 formed through the bottom wall 32 of throat portion 24 of guide chute 20. It will be noted that the bottom wall 32 of throat portion 24 extends in one direction a greater distance than does the top wall 30 thereof and is adapted to overlie the tongue 12 of the vehicle to which the hitch assembly is to be attached, said extending portion 42 of wall 32 being secured to said tongue 12 by means of bolts such as 44.

A tubular coupling pin 46 is reciprocably associated with the hitch assembly 10, the coupling pin having a ring 48 at the normally uppermost end thereof, the opposite end 50 of the coupling pin 46 being free to reciprocate within aligned holes 38 and 40 upon actuation of the hitch assembly 10.

Figure 2:
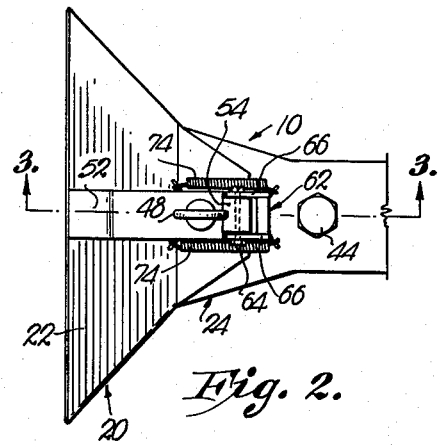
FIG. 2 is a fragmentary, top plan view of the hitch assembly.
Figure 4:
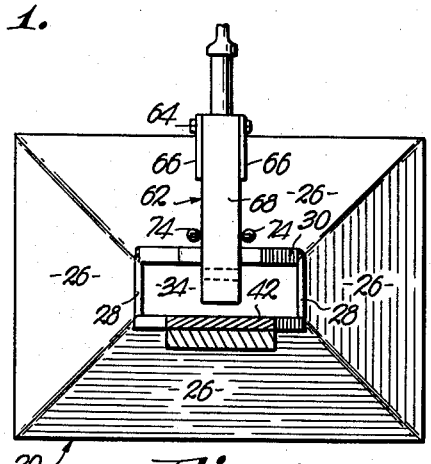
FIG. 4 is a rear elevational view of the hitch assembly.
Figure 3:
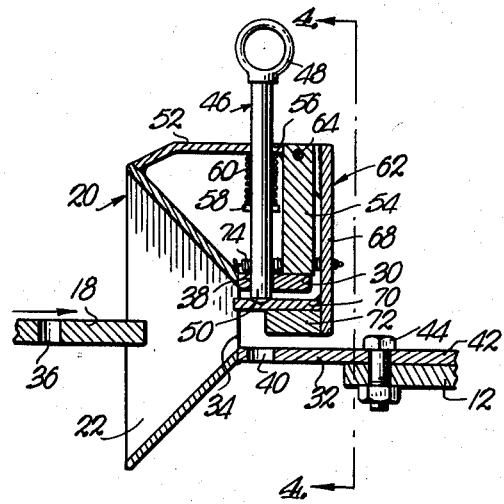
FIG. 3 is a sectional view taken on line 3—3 of FIG. 2 and showing the coupling pin at one end of its path of travel.
Figure 5:
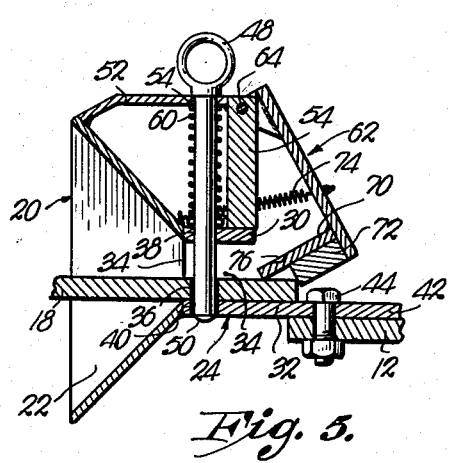
FIG. 5 is a sectional view similar to that of FIG. 3 but showing the coupling pin at the other end of its path of travel.

A beam 52 has one end thereof secured to the mouth portion 22 of guide chute 20 as clearly shown in FIGS. 2, 3 and 5 of the drawing, the other end of beam 52 being supported by a support post 54 whereby to position said beam 52 in a plane substantially parallel to the plane of walls 30 and 32 of throat portion 24 of the guide chute 20. A hole 56 is formed in beam 52, said hole 56 being in alignment with holes 38 and 40, said hole 56 receiving pin 46 therewithin whereby to maintain the same in the desired aligned position with respect to holes 38 and 40.

Pin 46 is provided with ears such as 58, which ears support a coil spring 60 in surrounding relationship to pin 46, the other end of coil spring 60 being in engagement with the normally lowermost face of beam 52 immediately surrounding hole 56. It thus will be appreciated that through the action of spring 60, the pin 46 is normally biased toward the bottom wall 32 of the assembly 10.

An L-shaped lever 62 is pivotally coupled to the hitch assembly 10, and more particularly, to support post 54, by means of a pivot pin 64 which engages gussets 66 secured to lever 62. Lever 62 includes a leg 68 and a base 70, the base 70 having an actuator block 72 carried thereby in underlying relationship thereto. Resilient means in the nature of a pair of coil springs 74 are secured to the guide chute of the hitch assembly at one end of said springs 74, the other end of said springs being secured to the leg 68 of lever 62 intermediate the ends thereof whereby to normally bias said lever 62 in a direction toward the mouth portion 22 of guide chute 20 of assembly 10.

Thus, it will be seen that when the assembly 10 is attached to a first vehicle through the utilization of extending portion 42 and bolts 44 as hereinabove described, the L-shaped lever 62 will be biased about pin 64 by springs 74 to a position where the base 70 of lever 62 underlies the end 50 of pin 46, said end 50 being received within a depression 76 which is formed in the face of base 70 proximal to end 50 of pin 46. With the lever 62 in said position, and as illustrated in FIG. 3 of the drawing, the pin 46 is supported at one end of its path of travel against the action of coil spring 60. The hitch assembly will remain in this condition until such time as the extension 18 of the second vehicle is moved through the opening 34 defined by mouth 22 and throat 24 of the guide chute 20 whereby to automatically actuate assembly 10 and cause the coupling of the first vehicle with the second vehicle. When this is accomplished, the parts of the assembly hereinabove described, move from the condition shown in FIG. 3 of the drawing to the condition shown in FIG. 5 of the drawing. Thus, as is apparent, the extension 18 moves, in a substantially horizontal plane, through the opening 34 into overlying relationship with wall 32 and extending portion 42 of assembly 10, and as extension 18 moves therethrough it engages actuator block 72, causing the same to swing to the right, viewing FIGS. 3 and 5, and thus moving base 70 from its position supporting pin 46 at one end of its path of travel to a position, shown in FIG. 5, whereby the pin 46 is allowed to reciprocate under the urging of spring 60 to the other end of its path of travel. It will be appreciated that, as pin 46 is urged toward the other end of its path of travel by spring 60, the full movement of the pin will be precluded by the extension 18 until such time as perforation 36 thereof becomes aligned with holes 38 and 40, and when this is achieved, the pin 46 will then be allowed to move to the position shown in FIG. 5 by passing through the perforation 36 of extension 18. When this has been accomplished, the extension 18 of the second vehicle 16 is suitably secured to the first vehicle 14 as a result of the pin 46 engaging said extension 18 by passing through perforation 36 thereof.

When it is desired to uncouple the two vehicles which have been coupled together in the manner hereinabove described, it is only necessary to grasp ring 48 of pin 46 and exert an upward pull whereby to allow the withdrawal of extension 18 from the opening 34. As this is accomplished, the springs 74 urge lever 62 back to the position shown in FIG. 3 of the drawing whereby the pin is supported at one end of its path of travel by base 70 and the hitch assembly 10 is again prepared for automatic actuation.

Having thus described the invention, what is claimed as new and desired to be secured by Letters Patent is:

A hitch assembly adapted for attachment to a first vehicle for coupling said first vehicle to a second vehicle, said assembly comprising a guide chute having a mouth portion and a throat portion, said portions having an opening extending therethrough for receiving a perforate extension of said second vehicle, said throat portion having a pair of spaced-apart, aligned holes formed therein; a beam on said chute and having a hole formed therein in alignment with the holes in said throat portion; a coupling pin reciprocably carried within said aligned holes; a coil spring surrounding said pin between said beam and said throat portion; a support post interconnecting said beam with the throat portion of said chute; an L-shaped lever having its normally upper end pivotally coupled with said support port, said lever having a leg and a base; resilient means connected to said leg and normally biasing said lever to a position with the base thereof within the opening through said chute and completely between the holes formed in the throat portion of the chute, said base being substantially planar and lying in a plane parallel to and spaced between that part of the guide chute defining said throat portion whereby said base fully supports said pin, against the action of said coil spring, at one end of its path of travel; and an actuator block carried by said base and engageable by said perforate extension of the second vehicle as the latter moves through said opening whereby to swing the base of said lever out of said throat portion of the opening and allow said pin to move to the other end of its path of travel to a coupling position within the holes of said throat and a perforation of said extension.

References Cited by the Examiner
UNITED STATES PATENTS 2,113,338   4/38   Wohldorf _____ 280—508
2,478,736   8/49   Balzer _____ 280—508

A. HARRY LEVY, *Primary Examiner.*